United States Patent Office 3,770,625

Patented Nov. 6, 1973

3,770,625
REMOVAL OF VIRUS FROM FLUIDS
Craig Wallis and Joseph L. Melnick, Houston, Tex., assignors to The Carborundum Company, Niagara Falls, N.Y.
No Drawing. Continuation-in-part of application Ser. No. 311,015, Nov. 30, 1972, which is a continuation of application Ser. No. 135,464, Apr. 19, 1971, both now abandoned. This application Mar. 16, 1973, Ser. No. 341,816

Int. Cl. B01d *15/06*

U.S. Cl. 210—36 7 Claims

ABSTRACT OF THE DISCLOSURE

A medium for adsorbing virus is contacted with an inorganic hydrolyzing composition thereby forming a treated medium having improved virus adsorbing properties. The treated medium is contacted with a fluid containing viruses whereby the viruses are removed from the fluid.

BACKGROUND OF THE INVENTION

This is a continuation-in-part of copending application Ser. No. 311,015, filed Nov. 30, 1972, which application is a continuation of Ser. No. 135,464, filed Apr. 19, 1971, now both abandoned.

Prior art processes of filtering fluids by mechanical entrapment necessitate the use of openings smaller in size than the microorganism to be removed. The extremely small passageways cause a high pressure drop between the influent and effluent sides of the filter, low capacities, and rapid clogging of the minute passageways. Furthermore, filter media of this type are generally ineffective in removing smaller sized microorganisms such as viruses.

Other methods of removing virus from fluids such as chemical flocculation, utilize the formation of a metal-virus complex which aggregates to form a separable precipitate. The virus is concentrated in the floc which must be in turn separated from the water by filtration or settling. These processes are, generally, uneconomical in that they require complex batch processes.

U.S. Pat. No. 2,701,792 to Owen, issued Feb. 8, 1955, discloses a process for removing bacteria from aqueous solutions by filtering the solution through an activated carbon which carries cobalt or other metals as a bactericide. U.S. Pat. No. 3,622,663, to Lapidus, issued Nov. 23, 1972, discloses an alkali treated calcium dihydrogen orthophosphate monohydrate adsorbent for influenza virus.

In addition to the above-described techniques, the principle of filter aid filtration has been used. Filter aids such as diatomaceous silica, perlite, and carbon and fibrous matter are coated with various organic compositions, such as triethylenetetramine which create charged sites that attract viruses. Such filter aids have, however, been found ineffective for removing a large variety of viruses.

SUMMARY OF THE INVENTION

The present invention contemplates a method for preparing a treated virus adsorbing composition by treating an adsorbing media such as activated carbon with an inorganic hydrolyzing composition of matter containing sodium. Virus are removed from a fluid containing virus by bringing the fluid into contact with the treated activated carbon adsorbing media.

Many of the deficiencies of the virus adsorbents of the prior art are overcome by the present method. For example, the treated activated carbon media binds virus so that a high pressure stream of fluid including organics passing through the virus containing treated media will not elute virus. The exhaustion or any ineffectiveness of the treated media can be easily detected. At that time the adsorbed virus can be rendered inactive and removed without the risk of environmental contamination. After the virus has been removed from the exhausted media, the media removed can be retreated for reuse in adsorbing additional virus. The use of readily available and inexpensive materials in the practice of the present invention makes it economically feasible to reclaim large quantities of waste water. Since high flow rates per treated media can be achieved, the novel methods and apparatus disclosed herein are also suited for reclaiming small volumes of water.

DETAILED DESCRIPTION

Media for adsorbing virus such as activated carbon are treated with an inorganic sodium containing hydrolyzing composition such as sodium hydroxide. Various grades of readily available activated carbons such as Columbia, Pittsburgh, Barnebey-Cheney, Continental, Bone Char, Acticarbone, Cochranex, Carboraffin, by way of illustration and not limitation, can be used as the medium. Such carbons can be prepared from a variety of sources such as wood, bones, blood, carbohydrates, coal, coconut shells, corncobs and cornstalks, kelp, lignite, nut shells, oil shale, petroleum coke, rubber waste and sawdust. The source material is generally activated by methods well-known in the prior art, such as pyrolysis of the source material followed by controlled oxidation.

The activated carbon employed may be in various forms, for example it may be in granular, powdered or pelleted form or combined in preformed materials such as fibers, slurry, paper or other supporting media. Because of a high adsorption rate, granular carbons are preferred. A mesh size of less than about 100 is peferred but larger sizes are suitable where higher flow rates are desirable.

Preferably the activated carbon has pores with diameters of from about 25 to about 300 angstroms, preferably from about 50 to about 200 angstroms. Preferably about 20 percent of the pores are within the above ranges.

The virus adsorbing medium is treated with an inorganic sodium containing hydrolyzing composition. The hydrolyzing composition is brought into contact with the medium through any system that produces sodium hydroxide. Preferably the hydrolyzing composition is an aqueous solution of sodium hydroxide.

The concentration of sodium hydroxide in the aqueous solution is not critical in the treatment of the media. The contact time is, however, to some extent dependent on the concentration of sodium hydroxide. Generally, a contact time of a few minutes to about one hour is sufficient, and greater contact times do not appreciably enhance the adsorption characteristics of the treated activated carbon. Lower concentrations of sodium hydroxide require an increase in contact time. Preferably the concentration of sodium hydroxide is from about 0.001 to about 3 moles per liter of water.

When activated carbon is employed as the media the surface of the activated carbon should be sufficiently wetted prior to treatment or during treatment to permit the contacting of the sodium hydroxide with the maximum surface area available. The treatment is normally carried out at room temperature and the temperatures employed during treatment of the media are not presently considered to be critical.

Preferably the virus adsorbing media is contacted with an inorganic acid prior to its treatment with sodium hydroxide. The use of an inorganic acid apparently results in an increase in the virus adsorbing sites when the adsorbing media is subsequently treated with sodium hydroxide. Although aqueous solutions having varying concentrations of acid were found to be effective, acid solutions having a normality from about 0.01 to about 1 are preferred. An aqueous solution of hydrochloric acid is exemplary.

The method of contacting the activated carbon with an inorganic acid is similar to the method employed in the subsequent contacting of the adsorbing media with sodium hydroxide.

The treated adsorbing medium is contacted with a fluid containing virus to thereby remove the virus from the fluid. For example, the fluid which contains a virus is passed through a bed of treated medium and the virus is retained by the medium so that only virus free fluid passes completely through the bed. Although the treated adsorbing medium is also effective in removing various organic compounds, suspended solids and pathogenic organisms such as found in contaminated water, viruses are effectively adsorbed to an extent previously considered impractical by prior art methods for isolating viruses. Because high concentrations of adsorbable material in the water reduce the life of the treated media due to adsorbing sites being occupied by material other than viruses, it is preferable that the virus containing fluid have low concentrations of other adsorbable material.

The amount of treated adsorbing media used to ensure virus free water varies with the contamination of the water with adsorbable material other than virus. The more adsorbable contaminants in the water, the greater the amount of treated adsorbing media needed. When the water has been pretreated to remove most adsorbable material other than virus, it is only necessary to provide sufficient treated adsorbing media to ensure an intimate contact with the water. Preferably organic material which might be present with viruses is removed prior to the virus filtration.

The treated adsorbing medium can be contacted with the virus containing fluid by using a variety of apparatus. A column having a fixed bed or fluid bed of virus adsorbing medium can be used. Commercially available filter cartridges having adsorbing medium in the path of fluid flow can also be conveniently treated to adsorb viruses. It is frequently desirable to have filtration downstream of the treated activated charcoal to remove any sluffed-off adsorbing medium. A dual media filter element as described in U.S. Pat. 3,334,752 to Matravers, with an inner treated activated carbon filter medium, may be used.

The adsorbent capacity of the virus adsorbing treated medium can be tested by adding a specific amount of adsorbable composition to the influent stream of fluid and determining the amount of adsorbable composition remaining in the effluent stream. If the concentration of the adsorbable composition is unduly high in the effluent the treated adsorbent media should be replaced or regenerated. Organic acids are particularly suited for this test. The test may also be performed visually with phenolphthalein red. Other conventional quantitative tests can be performed with other organic acids to detect the amount of acid in the effluent.

Treated activated charcoal that has been exhausted due to the adsorption of virus and other materials can be regenerated by contacting the exhausted activated charcoal with an inorganic acid. Aqueous solutions of acid are effective in rendering the virus inactive and removing them from the exhausted media. Preferably, an aqueous solution of hydrochloric acid of about 0.01 to about 1 normality is used. The carbon may then be retreated with sodium hydroxide as hereinbefore described to enhance its adsorbency.

The following examples are illustrative of the invention, and are not to be deemed limited thereof.

Example 1

A column 2.5 centimeters in diameter by 30 centimeters in height which has an influent passage at one end and an effluent passage at the other end is packed with 10 grams of activated carbon (Pittsburgh, 50 mesh). The activated carbon is treated by passing 10 ml. of an aqueous solution of one normal sodium hydroxide through the column at about 25° C. The aqueous sodium hydroxide solution is passed through the bed several times to thoroughly wet the surface of the activated carbon and stabilize the bed. The bed is then washed with water to remove residual sodium hydroxide.

Example 2

A filter cartridge (The Carborundum Co. RFS–10) which has an inner portion of activated carbon (Pittsburgh, GW14 by 40) and an outer cover of honeycomb wound fiber is mounted in a Fulflo® holder (The Carborundum Co.). The cartridge is treated in a manner similar to Example 1 by passing an aqueous solution of sodium hydroxide through the filter. The filter cartridge is subsequently washed with water.

Example 3

Columns similar to the one described in Example 1 are respectively packed with 10 grams of Columbia (50 mesh), 10 grams of Barnebey-Cheney (50 mesh), and 10 grams of Continental (50 mesh) activated carbons. An aqueous solution of 0.1 molar hydrochloric acid is passed through each of the columns. Next, the activated carbon is treated by passing an aqueous solution of 1 molar sodium hydroxide through each of the columns. The activated carbon beds are then washed with water.

Example 4

A control column similar to the one described in Example 1 is prepared by packing with 10 grams of activated carbon (Pittsburgh, 50 mesh). The bed formed by the activated carbon is washed with water to wet the surface of the carbon and stabilize the bed. No other treatment is given to this bed so that it may be used as a control for comparison purposes.

Example 5

Water containing about $5 \times 10^6$ infectious virus particles per 100 ml. is prepared. The virus is representative of various viruses found in sewage such as enteroviruses, reovirus and adenovirus. The amount of organics present in the water containing the virus in minimal. About 100 ml. of water containing the virus is passed through each of the columns described in Examples 1, 3, and 4, and the filter cartridge described in Example 2. The effluent or filtrate from each column or filter is tested for virus content. No virus is found in the effluent or filtrate from the columns and filter of Examples 1–3. The effluent from the untreated column of Example 4 contains about 317 virus particles per 100 ml. A polyelectrolyte method is used unless otherwise stated for counting the virus in this example and in the following examples; as set forth in "Concentration of Virus From Sewage and Excretion on Insoluble Polyelectrolytes"—Applied Microbiology, by Wallis et al., December 1969, pages 1007–1014.

Example 6

Tap water containing sodium thiosulfate, which is added in sufficient quantity to inactivate the chlorine present, is pumped at about $3.5 \times 10^6$ dynes/cm.$^2$ (50 p.s.i.) through the activated carbon beds as prepared in Example 1 and Example 4 with adsorbed virus, as described in Example 5. In this manner, about 3,800 liters (1,000 gallons) of water is forced through each bed. At intervals, about 3.8 liter (1 gallon) samples are collected and tested for their virus content. The results are reported in Table 1. Table 1 clearly indicates that no virus is eluted from the sodium hydroxide treated column as prepared in Example 1, while virus is continually eluted from the non-treated column as prepared in Example 4, even after about 3,800 liters (1,000 gallons) of water have passed through the column.

TABLE 1.—THE EFFECTS OF TAP WATERS ON THE ELUTION OF VIRUSES ADSORBED TO DIFFERENT CHARCOALS

| Liters of water passed through each bed prior to sampling | Infectious virus/liter of sample | |
| --- | --- | --- |
| | Untreated activated carbon | NaOH-treated activated carbon |
| 38 | 4,600 | 0 |
| 76 | 7,200 | 0 |
| 190 | 1,300 | 0 |
| 380 | 3,000 | 0 |
| 1,900 | 430 | 0 |
| 3,800 | 340 | 0 |

Example 7

The column of Example 6, containing the sodium hydroxide treated activated carbon with adsorbed virus, is treated with a variety of other adsorbents which are known to elute virus from known virus adsorbing media. These elutents include aqueous mixtures of serum proteins, casein, polyethylene glycol, borate buffers. After the elutent is passed through the column, it is collected and tested for virus content. No virus could be detected in any of the aforementioned elutents after contacting the treated activated carbon.

Example 8

An activated carbon bed is treated with sodium hydroxide in a manner similar to Example 1. The treated bed is contacted with 10 ml. of 2% fetal calf serum containing $1 \times 10^6$ virus particles. No virus particles are detected in the serum after passing it through the bed. A standard solution of phenolphthalein having a strong red color is flowed through the bed. The effluent is colorless, indicating that the bed is still active and the phenolphthalein is adsorbed. Next the bed is treated with additional 2% fetal calf serum which is recycled. The standard phenolphthalein solution is passed through the bed without any noticeable diminution in color, thereby indicating that the bed is exhausted. Next, about 100 virus particles in 200 ml. of saline solution are passed through the bed. The effluent is tested for virus and is found to contain about 100 virus particles, further indicating that the bed is exhausted. The bed is then treated with 100 ml. of 0.1 normal hydrochloric acid solution by passing the aqueous acid solution slowly through the bed. The bed is washed with water to remove residual acids. Next, the bed is treated with 10 ml. of 1 normal aqueous sodium hydroxide solution to regenerate the bed. The bed is washed to remove excess sodium hydroxide, and then challenged with 10 ml. of 2% fetal serum containing $1 \times 10^6$ virus particles. The serum is tested for virus content after passing through the bed and no virus is detected. The bed is exhausted and regenerated in the above described manner three times without any decrease in the virus adsorbing properties of the bed. The hydrochloric acid solution and the sodium hydroxide solution which are used for the initial treatment of the bed are used for subsequent regeneration treatments.

Example 9

A quantity of activated carbon (Pittsburgh, 50 mesh) is treated with an aqueous solution of 0.1 normal hydrochloric acid, followed by treatment with an aqueous solution of 1.0 normal sodium hydroxide solution. The activated carbon is washed with water. A 10 gram sample of the activated carbon is mixed with 10 ml. of an aqueous mixture containing types 1, 2 and 3 polio virus (both attenuated and virulent) for about one hour. The mixture is sedimented and the supernate is tested for virus. No virus is detected. This procedure is repeated using 10 gram samples of treated activated carbon with 10 ml. aqueous mixtures of: (1) echoviruses (types 1, 7, 9, 11 and 13); (2) Coxsackie viruses types A9 and B1–6; (3) type 12 adenovirus; and (4) reovirus types 1, 2 and 3. No viruses are detected in the respective supernates after mixing with the treated activated carbon.

Example 10

Each of the activated charcoal samples as prepared in Example 9 and which contain virus are treated by various methods to elute the virus from the treated activated carbon. The methods of attempted elution included sonic vibration and treatment with high pressure water. A variety of elutents including serum proteins, casein and polyethylene glycol are contacted with the treated activated carbon. No virus could be detected as being eluted from the treated activated carbon by any of the elution methods attempted.

Although certain embodiments of the invention have been disclosed for the purpose of illustration, it would be evident that various changes and modifications may be made without departing from the spirit and scope of this invention as described in the appended claims.

What is claimed is:

1. A method for removing virus particles from a liquid containing said virus particles, comprising the steps of providing an activated carbon adsorbent treated with an aqueous solution of sodium hydroxide, and contacting said liquid with said treated activated carbon.

2. A method as set forth in claim 1 wherein said liquid is water.

3. A method as set forth in claim 1 wherein said aqueous solution of sodium hydroxide is from about 0.001 to about 3.0 molar.

4. A method as set forth in claim 1 wherein said activated carbon is treated with an inorganic acid prior to treatment with said sodium hydroxide.

5. A method as set forth in claim 4 wherein said inorganic acid comprises hydrochloric acid.

6. A method as set forth in claim 1 wherein said activated carbon is contacted with said aqueous solution of sodium hydroxide for sufficient time to wet substantially all of the surface area of the carbon.

7. A method as set forth in claim 1 wherein said activated carbon has pores of from about 25 to about 300 angstroms diameter.

References Cited

UNITED STATES PATENTS

| 2,701,792 | 2/1955 | Owen | 210—36 |
| 3,622,663 | 11/1971 | Lapidus | 195—1.5 |

SAMIH N. ZAHARNA, Primary Examiner

B. CASTEL, Assistant Examiner

U.S. Cl. X.R.

195—1.5